(12) United States Patent
Yip et al.

(10) Patent No.: US 6,995,934 B2
(45) Date of Patent: Feb. 7, 2006

(54) NOISE SUPPRESSED DATA STORAGE MEDIA

(75) Inventors: Yung Yip, Afton, MN (US); Alexander Roesler, Tijeras, NM (US)

(73) Assignee: Imation Corp., Oakdale, MN (US)

( * ) Notice: Subject to any disclaimer, the term of this patent is extended or adjusted under 35 U.S.C. 154(b) by 240 days.

(21) Appl. No.: 10/328,471

(22) Filed: Dec. 23, 2002

(65) Prior Publication Data

US 2004/0120062 A1 Jun. 24, 2004

(51) Int. Cl.
  *E05D 11/06* (2006.01)
(52) U.S. Cl. .................. 360/48; 360/135; 360/131; 360/25
(58) Field of Classification Search ........... 360/25, 360/48, 135, 125; 714/25, 48; 428/579–680; 73/104–105; 356/600

See application file for complete search history.

(56) References Cited

U.S. PATENT DOCUMENTS

| | | | | |
|---|---|---|---|---|
| 5,062,021 A | * | 10/1991 | Ranjan et al. | 360/135 |
| 5,285,343 A | * | 2/1994 | Tanaka et al. | 360/131 |
| 5,939,170 A | * | 8/1999 | Nishimori et al. | 428/141 |
| 5,949,612 A | * | 9/1999 | Gudeman et al. | 360/97.01 |
| 6,164,118 A | * | 12/2000 | Suzuki et al. | 73/1.89 |
| 6,519,114 B1 | * | 2/2003 | Wang et al. | 360/135 |
| 6,804,822 B2 | * | 10/2004 | Sato et al. | 720/718 |
| 2002/0075586 A1 | * | 6/2002 | Dimitrov et al. | 360/57 |
| 2003/0008099 A1 | * | 1/2003 | Nishikawa et al. | 428/65.3 |

OTHER PUBLICATIONS

Leng et al. Bump Characterization with MR/GMR Head as Transducer, IEEE Transactions on Magnetics, vol. 36, No. 5, Sep. 2000.*

Tan et al, Measurement of Non-elastic Asperity Compliance of Magnetic Tapes, IEEE Transactions on Magnetics, vol. 34, No. 4, Jul. 1998.*

"Measurement of Non-elastic Asperity Compliance of Magnetic Tapes," Tan et al., *IEEE Transactions on Magnetics*, vol. 34, No. 4, Jul. 1998, pp. 1726-1728.

"Quantifying Advanced Tape Medium Noise," Roesler et al., *IEEE Transactions on Magnetics*, vol. 37, No. 2, Mar. 2001, pp. 1059-1066.

"Experimental Investigation of the Metal Particle Tape Medium Noise," Alexander Roesler, Ph.D. Dissertation, Carnegie Mellon University, Electrical and Computer Engineering, Jun. 2001, pp. 1-137.

"Novel Magnetic Characterization of the Head-Medium Interface in Metal Particle Tape Systems," Roesler et al., *IEEE Transactions on Magnetics*, vol. 37, No. 5, Sep. 2001, pp. 3850-3859.

* cited by examiner

*Primary Examiner*—David Hudspeth
*Assistant Examiner*—Dismery Mercedes
(74) *Attorney, Agent, or Firm*—Eric D. Levinson (57) ABSTRACT

Magnetic data storage media having recording layers that include microscopic surface protrusions are described. A recording head of a magnetic drive may contact the protrusions, i.e., the protrusion tops may define a load bearing surface area of the recording layers of such media. The heights of the protrusions under the recording head and distribution of the protrusions on the recording layers of such media may be substantially uniform. The load bearing surface area may be relatively small when compared to the total surface areas of the recording layers of such media. Also, the average distance between any two adjacent protrusions on such media may be defined based on the length of bits recorded thereon.

16 Claims, 7 Drawing Sheets

NOISE SUPPRESSED DATA STORAGE MEDIA

TECHNICAL FIELD

The invention relates to data storage, and more particularly to techniques for suppressing recording noise in signals recorded on magnetic data storage media.

BACKGROUND

Magnetic data storage media, such as magnetic tape and magnetic disks, are commonly used for storage and retrieval of data. In order to store data on a magnetic data storage medium, a recording head of a magnetic drive, such as a tape drive or disk drive, encodes the data in magnetizations of a recording layer of the medium. For example, the recording head may encode the data in transitions, which are regions of magnetization reversal. A read head of a magnetic drive may later detect the transitions, and the drive can interpret the detected transitions to retrieve the data.

Increasing data storage capacity is a paramount goal in the development of data storage media. The amount of data that a magnetic drive can store on the recording layer of a magnetic data storage medium is determined by the areal density with which bits of data are stored on the medium, and the area of the recording layer of the medium. Thus, it is desirable to increase the bit density of the medium to increase the data storage capacity for that medium without increasing the size of the medium. The drive may store bits of data on the medium end-to-end in side-by-side rows, sometimes referred to as tracks. Bit density is thus a function of length of the bits, i.e., the bit length, and the width of the tracks, i.e., the track width. In addition to increased data storage capacities, which allow storage of larger files or greater amounts of related data on a single medium, increased bit densities enable reduction in the size of magnetic data storage media and magnetic drives.

Magnetic transitions collectively represent a recorded signal that is reproduced by a magnetic drive via a read head. However, the reproduced signal typically includes noise. Generally speaking, noise comprises undesirable components of the reproduced signal that may interfere with the retrieval of the data by a magnetic drive. One type of noise that may be present in the reproduced signal is head-medium noise. Head-medium noise is caused by the interaction of the recording head and the medium surface during encoding of data on the magnetic media as transitions. Specifically, head-medium noise is caused by fluctuations in the spacing between the head and the medium surface, which are in turn caused by the interaction of the recording head with features, i.e., roughness, on the medium surface.

In order for a particular magnetic drive to accurately retrieve data stored on a magnetic data storage medium, the reproduced signal must have a sufficiently high signal-to-noise ratio. A signal-to-noise ratio is a measure of the strength of the components of a reproduced signal that communicate the data relative to the strength of the noise components of the reproduced signal. The signal-to-noise ratio of a reproduced signal typically decreases as the bit density increases. Therefore, the presence of head-medium noise in the reproduced signal limits the bit density that may be achieved on a particular magnetic data storage medium, thus limiting the data storage capacity of the medium.

SUMMARY

The invention is directed to magnetic data storage media having recording layers that include microscopic surface protrusions. Head-medium noise within signals recorded on magnetic data storage media that include such protrusions may be suppressed because of the distribution of the protrusions on the recording layers of such media, and various characteristics of the protrusions themselves.

For example, the distribution of the protrusions on the recording layers of such media may be substantially uniform, and the protrusions may define protrusion tops that are substantially coplanar under a recording head of a magnetic drive. The protrusion tops may define load bearing surface areas of such media, which may be relatively small when compared to the total surface areas of the recording layers of such media. Also, the average distance between any two adjacent protrusions in a down-track direction on such media may be defined based on the length of bits to be recorded thereon. The protrusions may be formed on the media via replication, ion beam milling, calendaring, laser texturing, chemical etching, self-assembled surface techniques, such as techniques involving the manipulation of surface chemistry to affect surface tension, or the like.

In one embodiment, the invention is directed to a magnetic data storage medium that comprises a substrate and a recording layer formed over the substrate. The recording layer is formed to include surface protrusions that may extend from the recording layer higher than an average surface height of the recording layer. The protrusions may be substantially uniformly distributed over the recording layer in order to assure that the suppression of head-medium noise resulting from characteristics of the distribution of the protrusions on the recording layer and various characteristics of the protrusions themselves is consistent throughout the medium. For example, a standard deviation of the distances between adjacent protrusions of the recording layer may be within fifty percent of an average distance between adjacent protrusions of the recording layer. The protrusions may define protrusion tops. The protrusions tops may be substantially coplanar under a recording head of a magnetic drive in order to limit the motion of the recording head relative to the medium in the y direction as the recording head moves relative to the recording layer in the x direction. Limiting the motion of the recording head in the y direction may suppress head-medium noise. For example, a standard deviation of the heights of the protrusions under the recording head relative to a planar location within the medium may be within fifty percent of an average height of the protrusions under the recording head relative to the planar location.

In another embodiment, the invention is directed to a magnetic data storage medium that comprises a substrate and a recording layer formed over the substrate to include surface protrusions that may extend from the recording layer higher than an average surface height of the recording layer. The protrusions may be substantially uniformly distributed over the recording layer. Further, the protrusions may define protrusion tops that define a load bearing surface area. The load bearing surface area may be less than one-half of a total surface area of the recording layer in order to improve the wear characteristics of the recording layer.

In another embodiment, the invention is directed to a magnetic data storage medium that comprises a substrate and a recording layer formed over the substrate to include surface protrusions that may extend from the recording layer higher than an average surface height of the recording layer.

The protrusions may be substantially uniformly distributed over the recording layer. Further, an average distance between adjacent protrusions in a down-track direction may be greater than ten times a bit length, and the bit length may be within a range from 0.025 micron to one micron. Defining the average distance between adjacent protrusions to be greater than the bit length may desirably locate head-medium noise within signals stored on the medium within a narrow frequency range around the frequency at which data is stored on the medium.

In another embodiment, the invention is directed to a magnetic data storage medium that comprises a substrate and a recording layer formed over the substrate to include surface protrusions that may extend from the recording layer higher than an average surface height of the recording layer. The protrusions may be substantially uniformly distributed over the recording layer. The protrusions may define protrusion tops that may be substantially coplanar under a recording head. The protrusions tops may define a load bearing surface area, which may be less than one-half of a total surface area of the recording layer. Additionally, an average distance between adjacent protrusions in a down-track direction may be greater than ten times a bit length, and the bit length may be within a range from 0.025 micron to one micron. Further, an average height of the protrusions under the recording head may be greater than twice an average media roughness of the medium and less than one-tenth of a micron.

In another embodiment, the invention is directed to a method comprising identifying a bit length and a write track width for a magnetic medium, selecting characteristics of surface protrusions and a distribution of the protrusions on a recording layer of the magnetic recording medium based on the bit length and the write track width, and constructing the magnetic data storage medium that includes protrusions with the selected characteristics.

The various embodiments may be capable of providing one or more advantages. In particular, the characteristics of the distribution of the protrusions on the recording layers, and of the protrusions themselves as described herein may lead to suppression of head-medium noise within signals recorded on magnetic data recording media that include such protrusions. As head-medium noise is suppressed due to the distribution of the protrusions and the characteristics of the protrusions, the bit density associated with the medium including these protrusions may increase. Further, head-medium noise suppression may allow the use of less complicated or less expensive devices to retrieve data from such a medium.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
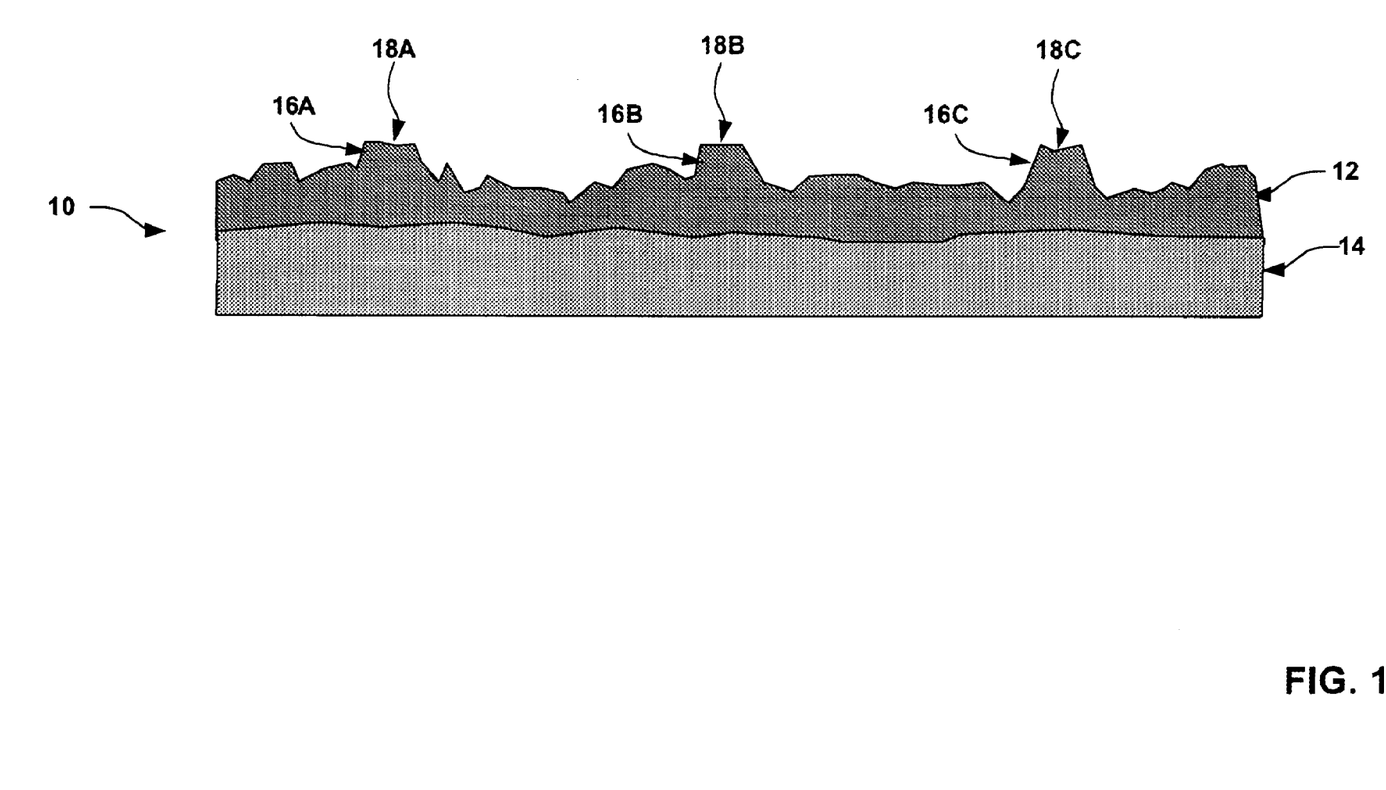
FIG. 1 is a cross-sectional side view of a magnetic recording medium.

FIG. 1 is a cross-sectional side view of a magnetic recording medium 10. Medium 10 includes a magnetic recording layer 12 and a substrate 14. Medium 10 may include additional layers (not shown), such as a backside coating beneath substrate 14, or other layers between recording layer 12 and substrate 14. Moreover, magnetic recording layer 12 may comprise a set of sub-layers, e.g., a multi-layered magnetic stack. In general, magnetic recording layer 12 comprises a layer that includes at least one magnetic material to facilitate magnetic recording.

Substrate 14 is typically formed of plastic such as polyethylene terephthalate or polyethylene naphthatlate, although other substrate materials could be used, including metal or a different polymer material. In any case, substrate 14 provides the foundation for recording layer 12. Recording layer 12 may be applied as a coating over substrate 14. By way of example, recording layer 12 may comprise a ferromagnetic material such as gamma ferric oxide, and may also include a binder and a dry lubricant. In some embodiments, medium 10 may comprise a sputtered or evaporated metallic medium.

Although recording layer 12 is generally smooth on a macroscopic level, recording layer 12, as shown in FIG. 1, includes irregularities at the microscopic level. Notably, recording layer 12 includes surface protrusions 16A–16C (collectively "protrusions 16"), which are regions of recording layer 12 that extend from recording layer 12 higher than the average surface height of recording layer 12. Protrusions 16 may, as shown in FIG. 1, be formed to have a generally mesa-like shape, with substantially planar protrusion tops 18A–18C (collectively "protrusion tops 18").

The distribution of protrusions 16 on recording layer 12 may be substantially uniform. Further, protrusions 16 can be formed such that the heights of protrusions 16 under a recording head (not shown) of a magnetic drive (not shown) are substantially uniform, i.e., such that protrusion tops 18 are substantially coplanar under the recording head. Head-medium noise can be suppressed within signals recorded on medium 10 due to the substantially uniform distribution of protrusions 16 and heights of protrusions 16 under the recording head, as well as other characteristics of the distribution of protrusions 16 and of protrusions 16 themselves, as will be described in greater detail below.

The head-medium noise suppression permitted by medium 10 may advantageously allow data to be stored on medium at greater bit densities than can be achieved on conventional magnetic recording media. While recording layers of conventional magnetic recording media may include surface irregularities, the recording layers of conventional magnetic recording media do not include protrusions 16 that are distributed in a substantially uniform manner, with protrusion tops 18 that are substantially coplanar under a recording head. Moreover, conventional recording media may lack particular characteristics of protrusions 16, or of the distribution of protrusions 16 that can improve the media as described in greater detail below.

Figure 2:
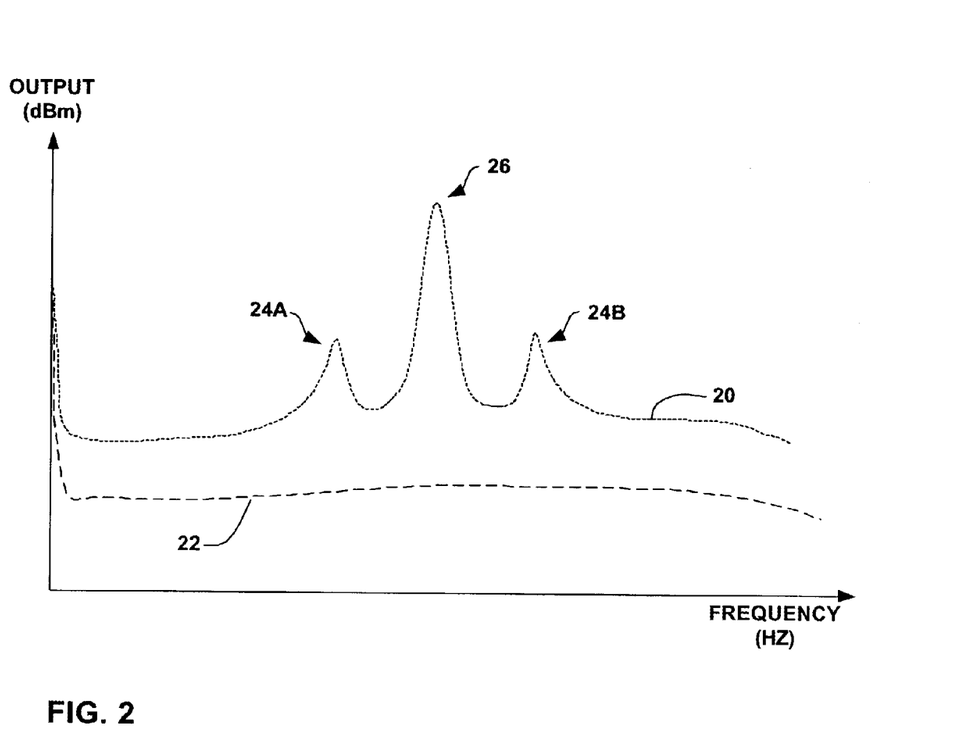
FIG. 2 is a graph illustrating head-medium noise within a reproduced signal.

FIG. 2 is a graph illustrating head-medium noise within a reproduced signal 20. Specifically, FIG. 2 illustrates an output spectrum of reproduced signal 20. Head-medium noise generally refers to undesirable components of reproduced signal 20 caused by recording of that signal on a medium. Head-medium noise is undesirable because it may interfere with the retrieval of the data by a magnetic drive.

Head-medium noise is reflected in the noise floor of reproduced signal 20, which is increased relative to the noise floor 22 present in a medium in the absence of recorded magnetic transitions. Head-medium noise is also reflected in the side bands 24A and 24B, which appear both above and below the frequency at which the signal power 26 is located. The causes of head-medium noise will be discussed in greater detail below with reference to FIGS. 3 and 4.

Figure 3:
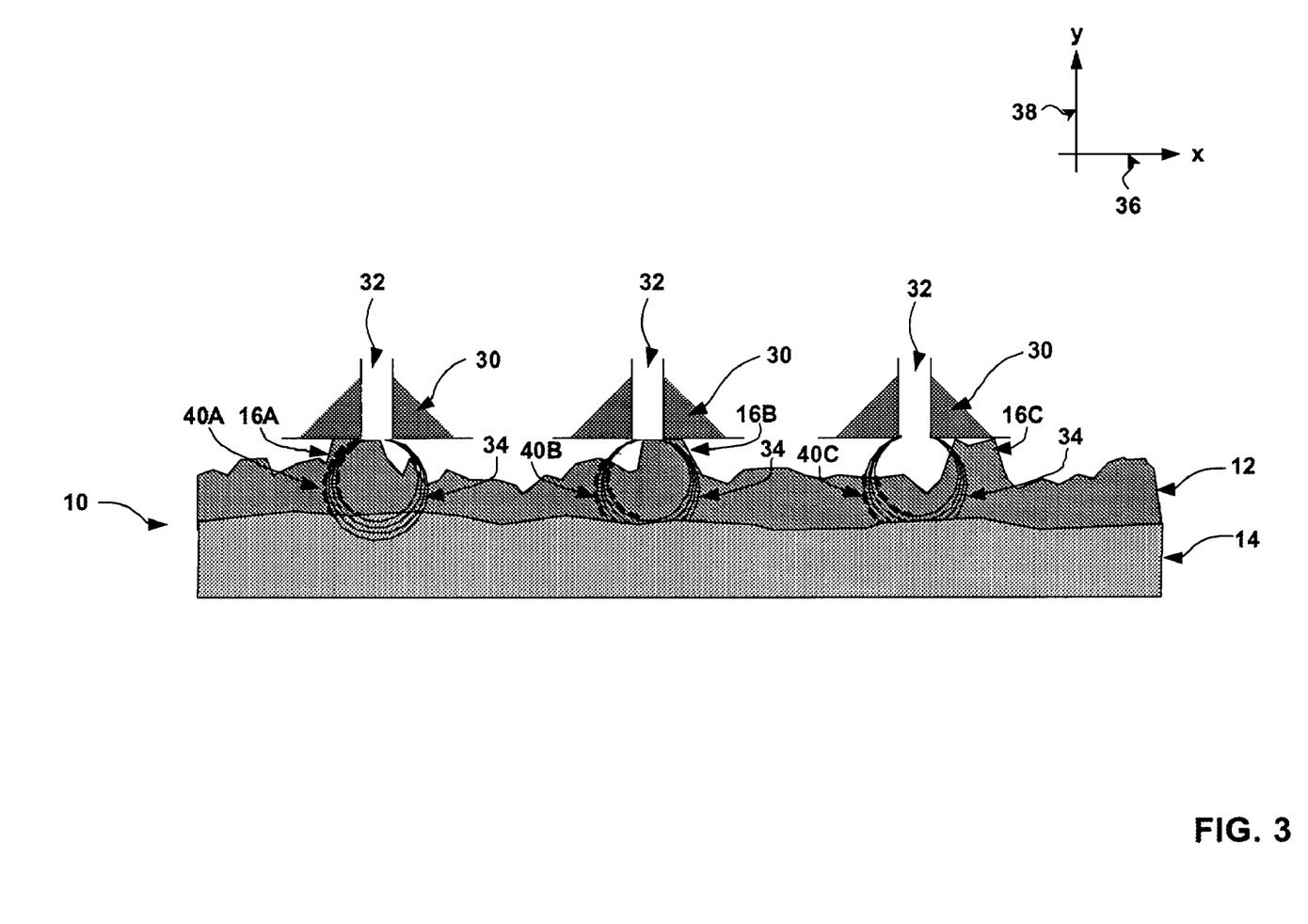
FIG. 3 is a cross-sectional side view of the magnetic recording medium of FIG. 1 and a recording head.

FIG. 3 shows a cross-section of a recording head 30 of a magnetic drive (not shown), such as a tape drive or disk drive. Recording head 30 may be an electromagnet, and typically includes a recording gap 32 that is positioned near magnetic recording medium 10. Recording head 30 is energized by the drive to generate a recording field 34, which may be a fringing magnetic field that emanates from gap 32. As shown in FIG. 3, recording field 34 has a substantially circular profile that extends from gap 32 and permeates through magnetic recording medium 10. Recording field 34 in FIG. 3 represents the portion of the generated magnetic field that is strong enough to magnetize recording layer 12, and not necessarily the entire field generated by recording head 30. Recording field 34 permeates recording layer 12, recording magnetic transitions 40A–40C (collectively "transitions 40") in recording layer 12.

As shown in FIG. 3, recording head 30 moves relative to recording layer 12 of magnetic recording medium 10 in direction x, indicated by reference numeral 36. Recording head 30 is in contact with recording layer 12 as recording head 30 moves relative to recording layer 12. In particular, recording head 30 is in contact with tops 18 (FIG. 1) of protrusions 16 as recording head 30 moves relative to recording layer 12. Protrusions 16 can provide a desirable contact surface for recording head 30, providing advantages in terms of reduced head wear. Additionally, as outlined in greater detail below, the distribution and size of protrusions 16 can be defined in a manner that advantageously suppresses head-medium noise.

As recording head 30 moves relative to recording layer 12 in direction x, recording head 30 moves, positively or negatively, in direction y, indicated by reference numeral 38, relative to medium 10. However, because recording layer 12 includes protrusions 16, the movement of recording head 30 in the y direction 38 may be limited to movement due to the insubstantial variation in the heights of protrusions 16 when under head 30. Accordingly, head to recording layer spacing can be held substantially constant, or at least the positive or negative movement in the y direction 38 can be reduced relative to recording layers of conventional media that lack protrusions with substantially uniform heights under a recording head. In either case, medium 10 can be improved by the presence of protrusions 16 with protrusions tops 18 that are substantially coplanar under recording head 30, because the reduction in head 30 movement relative to the recording layer 12 can decrease head-medium noise within signals recorded on medium 10, as will be described in greater detail below. Moreover, defined distribution of protrusions 16 on recording layer 12 can act to limit the surface area of recording layer 12 that interacts with recording head 30, which can decrease wear.

Figure 4:
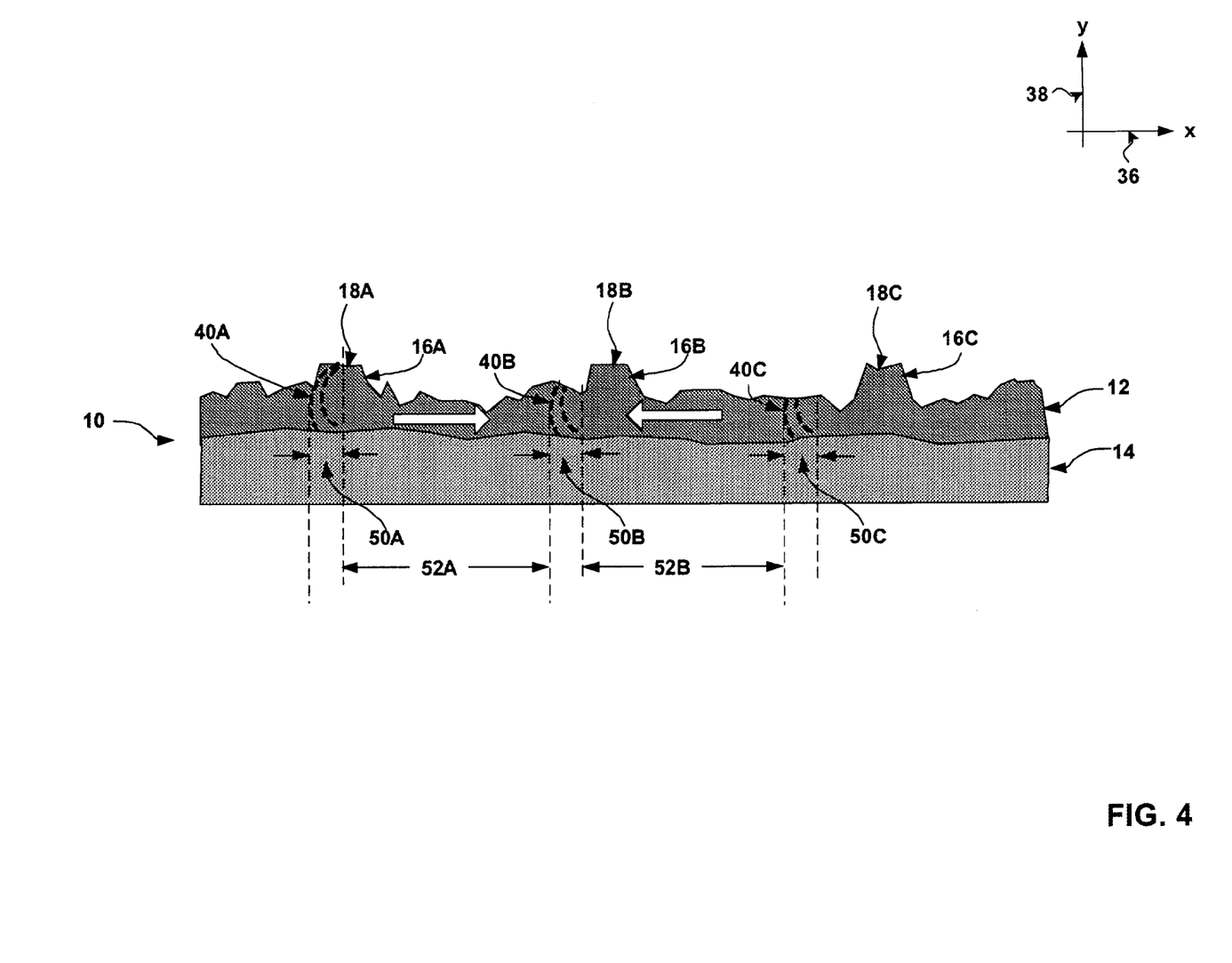
FIG. 4 is a cross-sectional side view of the magnetic recording medium of FIG. 1, further illustrating magnetic transitions within a recording layer of the recording medium.

FIG. 4 is a cross-sectional side view further illustrating magnetic transitions 40A–40C within recording layer 12 of medium 10. In particular, magnetic transitions 40 in recording layer 12 are caused by recording field 34 generated by recording head 30, as shown in FIG. 3. The profiles of transitions 40, as shown in FIG. 4, broaden at greater depths of recording layer 12, because the gradient of recording field 34 broadens as recording field 34 extends in the negative y direction 38 and penetrates recording layer 12, as shown in FIG. 3. The shapes of transitions 40 vary, as shown in FIG. 4, because the depth of recording layer 12 varies, i.e., the distance between recording layer 12 and recording head 30 varies as shown in FIG. 3.

The movement of recording head 30 and recording field 34 in the y direction 38 relative to medium 10, however, is limited to the insubstantial variation in heights of protrusions 16 under recording head 30. Thus, the portion of the record field 34 within any given cross-section in the x direction 36 of recording layer 12 remains substantially constant as recording head 30 travels across recording layer 12. As a result, the variation of widths 50A–50C (collectively "widths 50") of transitions 40A–40C is limited. Further the variation of distances 52A and 52B (collectively "distances 52") between transitions 40A and 40B and transitions 40B and 40C, respectively, is limited. Importantly, head-medium noise can be reduced by limiting these variations in widths 50 and distances 52.

"Transition width broadening" and "position jitter" that result from the head-medium interactions (i.e., variations in the head-medium spacing during the recording) are two sources of the head-medium noise. Transition width broadening refers to the variation of widths 50 of transitions 40 caused by movement of recording head 30 and record bubble 34 relative to medium 10 in the y direction 38 as recording head 30 moves relative to recording layer 12 in the x direction 36. Position jitter refers to the variation of distances 52 between transitions 40 caused by movement of recording head 30 and record bubble 34 relative to medium 10 in the y direction 38 as recording head 30 moves relative to recording layer 12 in the x direction 36. The limitation of the variations between widths 50 of transitions 40, and distances 52 between transitions 40, limits the effect of transition width broadening and position jitter on signals recorded on medium 10. In particular, the inclusion of protrusions 16 with substantially uniform heights under recording head 30, i.e., with tops 18 that are substantially coplanar under recording head 30, within recording layer 12 causes this limitation in width 50 variance and distance 52 variance, which in turn limits the effects of transition width broadening and position jitter. Accordingly, the inclusion of protrusions 16 with substantially uniform heights under recording head 30 within recording layer 12 can lead to a broadband reduction of the head-medium noise within signals recorded on medium 10.

Head-medium interactions that occur over spatial frequencies that span up to the frequency of the recorded signal will modulate the recorded signal and cause a broadband noise floor. By spacing the protrusions at distances much greater than a bit length, the head-medium noise will be located at frequencies much lower than the recorded signal, i.e., the head-medium interactions will predominately possess wavelengths that are long compared to the bit length. In other words, the noise floor of signals recorded on medium 10 may be reduced across the frequency spectrum relative to reproduced signal 20 illustrated in FIG. 2. The broadband reduction of the head-medium noise improves the ability of magnetic drives to read back signals from medium 10 at increased storage densities.

Moreover, the head-medium noise that remains within signals recorded on medium 10 may be located in a relatively narrow frequency range about the frequency at which the data is stored thereon, i.e., the frequency at which the signal power 26 is located as shown in FIG. 2, allowing for easier retrieval of the data by a magnetic drive. Head-medium noise that is caused by surface features of medium 10 that occur at low spatial frequencies relative to the frequency at which data is stored thereon may lead to side bands 24 illustrated in FIG. 2. As the spatial frequency of the surface features approaches zero, the distance between side bands 24 and signal power 26 approaches zero, which allows a magnetic drive to more easily retrieve the data.

Side bands 24 in FIG. 2 may also be caused by variations in the amplitude of magnetic transitions recorded on medium 10. The variations in amplitude of the magnetic transitions are caused by variations in the depth of recording layer 12 where the transitions are located, i.e., the amount of magnetized material. Thus, for example, the amplitude of transitions recorded at protrusions 16 would be greater than the amplitude of transitions recorded at locations of recording layer 12 between protrusions 16.

The distribution of protrusions 16 on recording layer 12 can act to locate head-medium noise, which may be caused by transition width broadening and position jitter, and amplitude modulation noise, within a relatively narrow frequency range about the frequency at which signal power 26 is located. In particular, protrusions 16 are distributed such that the surface area of recording layer 12 that interacts with recording head 30, i.e., the area of the tops 18 of protrusions 16, is relatively small when compared to the total surface area of recording layer 12, and such that the average distance in a down-track direction between adjacent protrusions 16 is sufficiently greater than the length of a bit recorded on medium 10, which correlates with the frequency at which data is recorded on medium 10. Distribution of protrusions 16 in this manner may cause movement in the y direction 38 by recording head 30 due to the insubstantial variation in heights of protrusions 16 under recording head 30 as it moves relative to recording layer 12 to occur at low frequencies relative to the frequency of the data, which, in turn, will lead to low frequency variations between widths 50 of transitions 40, and distances 52 between transitions 40 relative to the frequency of the data. Further, distribution of protrusions 16 in this manner may cause amplitude modulation to occur at a low frequency relative to the frequency of the data. Low frequency variations between widths 50 of transitions 40, and distances 52 between transitions 40, and low frequency amplitude modulation relative to the frequency of the data, may cause one or both of these noise components to be located within a relatively narrow frequency range about the frequency at which signal power 26 is located.

Figure 5:
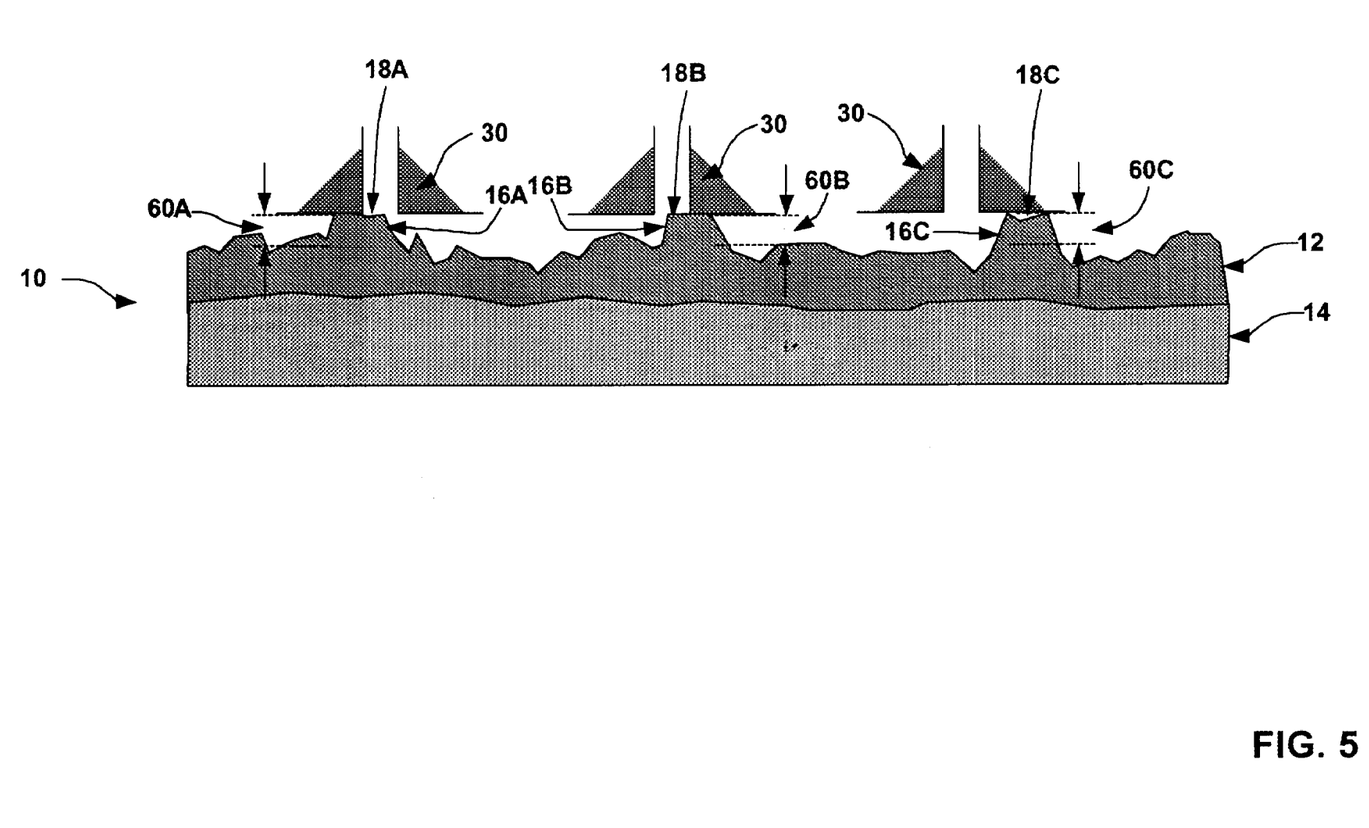
FIG. 5 is a cross-sectional side view of the magnetic recording medium of FIG. 1, illustrating the heights of protrusions on the recording layer of the medium under the recording head.

FIG. 5 illustrates the respective heights 60A–60C (collectively "heights 60") of protrusions 16 on recording layer 12 of medium 10 under recording head 30. Heights 60 of protrusions 16 may, as shown in FIG. 5, be measured relative to a defined reference point within medium 10 such as a location defined by the average surface roughness of medium 10. As discussed above, heights 60 of protrusions 16 can be made substantially uniform under recording head 30, i.e., tops 18 of protrusions 16 can be made substantially coplanar under recording head 30, which can lead to broadband suppression of head-medium noise within signals recorded on medium 10. In particular, for effective broadband suppression of head-medium noise, it is desirable to ensure that a standard deviation of heights 60 under recording head 30 is within fifty percent of an average of heights 60 under recording head 30. Preferably, the standard deviation of heights 60 under recording head 30 is within thirty percent of the average of heights 60 under recording head 30.

Additionally, in order to ensure that protrusions 16 are the portion of recording layer 12 that interacts with recording head 30, the average of heights 60 can be made greater than the average height of medium 10, i.e., the average surface roughness of medium 10. In one example, the average heights 60 may be greater than twice the average roughness. However, the heights 60 should not be so great such that signals are not effectively recorded on medium 10 due to spacing loss. Thus, it may be desirable that the average of heights 60 is less than one-tenth of a bit length, which may be less than one micron.

Protrusions 16 can be made rigid enough to withstand contact with recording head 30 without compressing to the extent that the regions between protrusions come into contact with recording head 30. The ability of protrusions 16 to withstand pressure may be measured using an asperity compliance tester. It may be desirable to construct protrusions such that an increase in a load bearing surface asperity contact area of recording layer 12 corresponding to a change in a pressure applied to the recording layer 12 from 0.2 atmospheres to 1.0 atmospheres is less than fifty percent. This can ensure that over-compression of protrusions is avoided.

Figure 6:
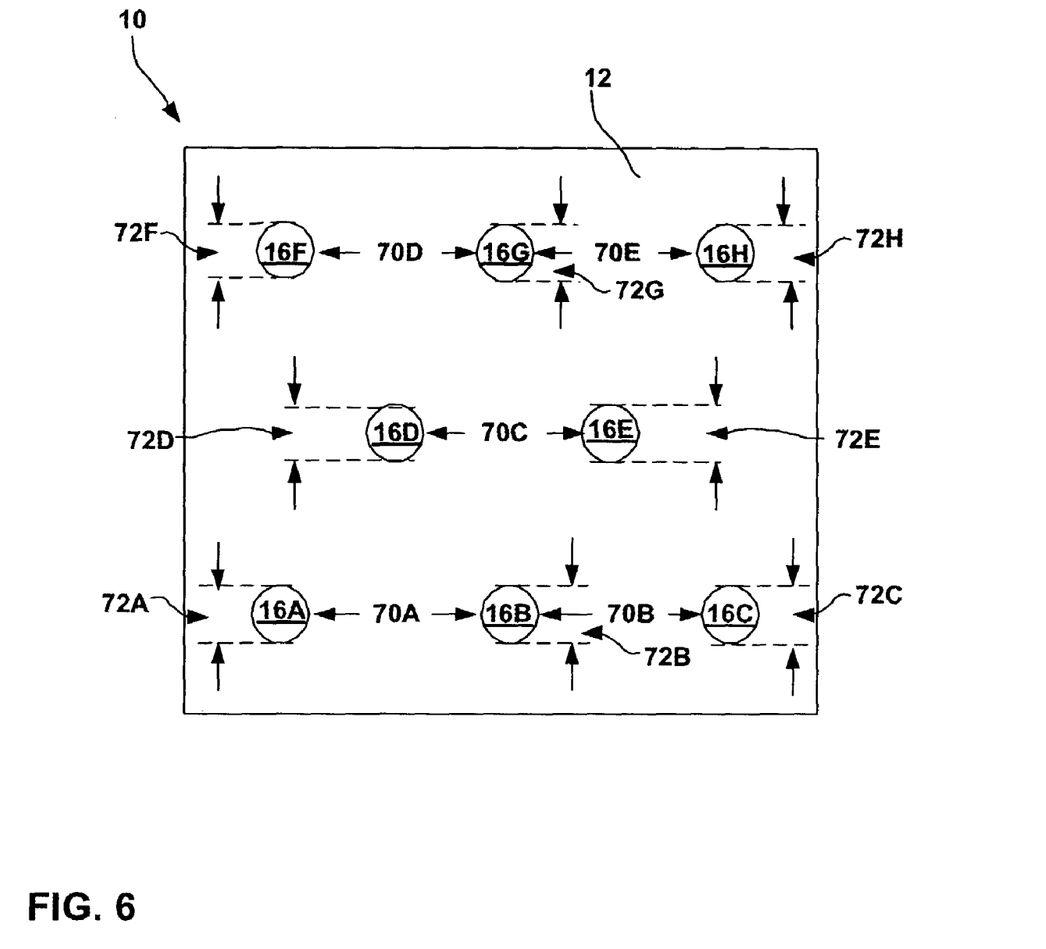
FIG. 6 is a top-view of the magnetic recording medium of FIG. 1, illustrating the distribution of protrusions on the recording layer of the medium.

FIG. 6 is a top-view diagram of medium 10, illustrating a distribution of protrusions 16 on recording layer 12. Although protrusions 16 may be of any shape, and the shapes of protrusions 16 may be irregular as illustrated in FIGS. 1, 3–5, protrusions 16 are depicted in FIG. 6 as having circular profiles for ease of illustration.

As discussed above, the distribution of protrusions 16 on recording layer 12 may cause head-medium noise within a signal recorded on medium 10 to be located in a relatively narrow frequency range about the frequency at which the data is stored thereon, allowing for easier retrieval of the data by a magnetic drive. Protrusions 16 can be distributed such that the surface area of recording layer 12 that interacts with recording head 30, i.e., the area of the protrusion tops 18, is relatively small when compared to the total surface area of recording layer 12. In particular, protrusions 16 may be distributed on recording layer 12 such that the load bearing surface area of recording layer 12 is less than one-half, and preferably less than twenty percent, of the total surface area of recording layer 12. In other words, the tops 18 of the protrusions may comprise less that one-half, and preferably less than twenty percent of the surface area of recording layer 12.

In order to cause head-medium noise within a signal recorded on medium 10 to be located in a relatively narrow frequency range about the frequency at which the data is stored thereon, protrusions 16 can be distributed such that the average of distances 70A–E (collectively "distances 70") between adjacent protrusions 16 is sufficiently greater than the length of a bit recorded on medium 10. Distances 70 may, as shown in FIG. 6, be measured in a down-track direction. This effect may be achieved where the average of distances 70 is greater than ten, and preferably greater than twenty, bit lengths. A bit may range from 0.025 micron to one micron in length.

Further, it may be desirable to limit the interaction of protrusions 16 with recording head 20 within each write track. To that end, the average of the widths 72A–H (collectively "widths 72") of protrusions 16A–H, respectively, may be less than one-half of the width of a write track. Widths 72 may, as shown in FIG. 6, be measured in a cross-track direction 76, and when protrusions 16 have generally circular profiles as shown in FIG. 6, widths 72 may be diameters of protrusions 16. The write track width will generally be less than 20 microns. Accordingly, the widths 72 of protrusions 16 can be made less than 10 microns to sufficiently limit interaction between head 30 and protrusions 16.

Moreover, so that the suppression and desirable location of head medium noise is consistent throughout medium 10, the distribution of protrusions 16 on recording layer 12 can be made substantially uniform. A substantially uniform distribution of protrusions 16 on recording layer 12 may be a distribution where the standard deviation of distances 70 between adjacent protrusions 16 is within fifty percent of the average of distances 70. In some embodiments, the standard deviation of distances 70 is within thirty percent of the average of distances 70.

Figure 7:
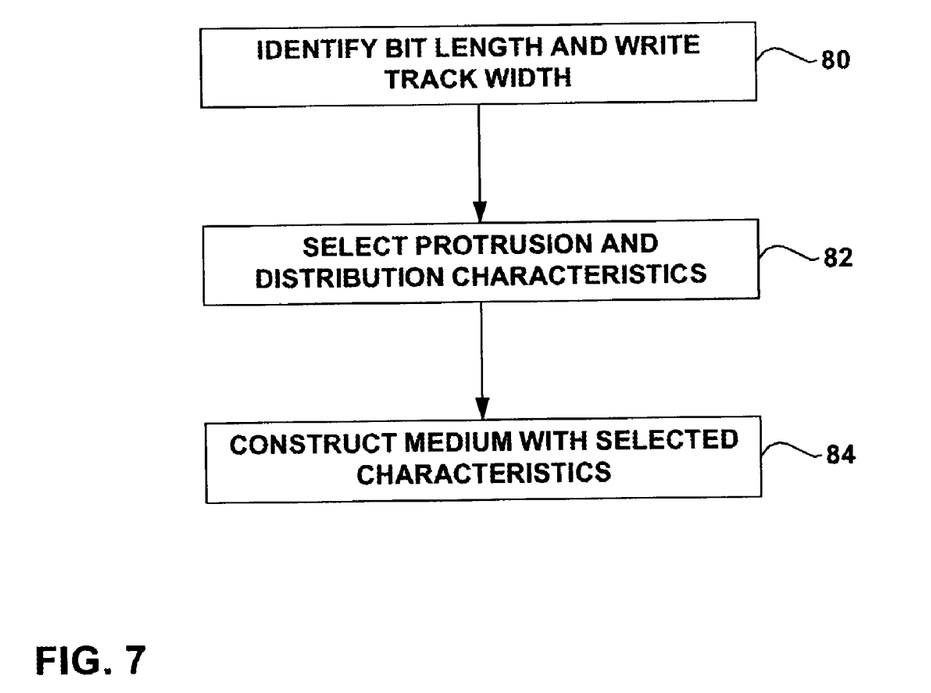
FIG. 7 is a flow chart illustrating an example method for constructing a magnetic recording medium.

FIG. 7 is a flow chart illustrating an example method for constructing a magnetic recording medium, such as medium 10 with recording layer 12 that includes protrusions 16 as described above. Initially, the bit length and write track width that will be used by a magnetic drive to store data on the medium 10 may be identified (80). Characteristics of protrusions 16 and of the distribution of protrusions 16 may then be selected based, in part, on the identified bit length and write track width, as described above (82). For example, an average of distances 70 between protrusions 16 in down-track direction 74 may be selected based upon the identified bit length, and an average of widths 72 of protrusions 16 in cross-track direction 76 may be selected based upon the identified write track width, as described above. The average of distances 70 and widths 72 may also be selected such that the load bearing surface area of recording layer 12 is small relative to the surface area of recording layer 12 as a whole, as described above. An average height 60 for protrusions 16 under recording head 30 may also be selected.

A medium 10 can then be constructed to have the selected characteristics (84). In order to construct the medium 10, substrate 14 may be coated with recording layer 12, and the resulting construction may be calendared and lapped, as is known in the art. In order to create the defined surface variations, i.e., protrusions having desired shapes and distributions, one of a wide variety of techniques may be used. For example, a microreplication drum, a textured calendaring drum, a chemical etching process, a mechanical texturing process, an ion beam milling process, a laser texturing process, or the like may be used to create the desired surface variations defined to improve media quality by suppressing recording noise as outlined herein. In any case, the protrusions are replicated or otherwise formed onto recording layer 12 of medium 10.

Various embodiments of the invention have been described. For example, microscopic surface protrusions 16, generally in the shape of mesas, for magnetic storage media have been described which can effectively suppress the occurrence of recording noise and thereby improve effective storage densities that can be achieved in magnetic media. Nevertheless, various modifications may be made without departing from the spirit and scope of the invention. For example, other protrusion shapes may be used instead of mesas in order to achieve the same or similar advantages to those described herein. For example, the surface protrusions 16 may have mesa shapes, pyramid-like shapes, rounded shapes, or the like. Further, the heights of protrusions may be quite variable in the absence of a recording head, so long as the protrusions deform under the recording head to be substantially coplanar. These and other embodiments are within the scope of the following claims.

What is claimed is:

1. A magnetic data storage medium comprising:
    a substrate; and
    a recording layer formed over the substrate to include surface protrusions that extend from the recording layer higher than an average surface height of the recording layer, wherein the protrusions are substantially uniformly distributed over the recording layer and define protrusion tops that define a load bearing surface area that is less than one-half of a total surface area of the recording layer, and wherein an average distance between adjacent protrusions in a down-track direction is greater than twenty times a bit length.

2. The magnetic data storage medium of claim 1, wherein a standard deviation of distances between adjacent protrusions of the recording layer is within fifty percent of an average distance between adjacent protrusions of the recording layer.

3. The magnetic data storage medium of claim 1, wherein the load bearing surface area is less than twenty percent of a total surface area of the recording layer.

4. The magnetic data storage medium of claim 1, wherein an average width of the protrusions in a cross-track direction is less than one-half of a write track width, the write track width being less than twenty microns.

5. The magnetic data storage medium of claim 1, wherein an average distance between adjacent protrusions in a down-track direction is greater then ten times a bit length, the bit length being within a range from 0.025 micron to one micron.

6. A magnetic data storage medium comprising:
    a substrate; and
    a recording layer formed over the substrate to include surface protrusions that extend from the recording layer higher than an average surface height of the recording layer,
    wherein the protrusions are substantially uniformly distributed over the recording layer and an average distance between adjacent protrusions in a down-track direction is greater than twenty times a bit length.

7. The magnetic data storage medium of claim 6, wherein a standard deviation of distances between adjacent protrusions of the recording layer is within fifty percent of an average distance between adjacent protrusions of the recording layer.

8. The magnetic data storage medium of claim 6, wherein the bit length is within a range from 0.025 micron to one micron.

9. The magnetic data storage medium of claim 6, wherein an average width of the protrusions in a cross-track direction is less than one-half of a write track width, the write track width being less than twenty microns.

10. A magnetic data storage medium, comprising:
    a substrate; and
    a recording layer formed over the substrate to include surface protrusions that extend from the recording layer higher than an average surface height of the recording layer, wherein the protrusions are formed as mesas,
    wherein the protrusions are substantially uniformly distributed over the recording layer and define protrusion tops that are substantially coplanar under a recording head, the protrusion tops define a load bearing surface area that is less than one-half of a total surface area of the recording layer, and an average distance between adjacent protrusions in a down-track direction is greater than twenty times a bit length, the bit length being within a range from 0.025 micron to one micron.

11. The magnetic data storage medium of claim 10, wherein a standard deviation of distances between adjacent protrusions of the recording layer is within fifty percent of an average distance between adjacent protrusions of the recording layer and a standard deviation of heights of the protrusions under the recording head relative to a planar location within the medium is within fifty percent of an average height of the protrusions under the recording head relative to the planar location.

12. The magnetic data storage medium of claim 10, wherein an average width of the protrusions in a cross-track direction is less than one-half of a write track width, the write track width being less than twenty microns.

13. The magnetic data storage medium of claim 10, wherein an average height of the protrusions under the recording head is greater than twice an average media roughness of the medium and less than one-tenth of a micron.

14. A method comprising:

identifying a bit length and a write track width for a magnetic medium;

selecting characteristics of surface protrusions and a distribution of the protrusions on a recording layer of the magnetic medium based on the bit length and the write track width; and constructing the magnetic data storage medium that includes protrusions with the selected characteristics, wherein the characteristics are selected such that an average distance between adjacent protrusions in a down-track direction is greater than twenty times the bit length.

15. The method of claim 14, wherein selecting characteristics comprises selecting an average distance between adjacent protrusions in a down-track direction based on the bit length and selecting an average width of the protrusions in a cross-track direction based on the write track width.

16. The method of claim 14, wherein constructing a magnetic data storage medium comprises microreplicating protrusions with the selected characteristics on the recording layer.

* * * * *